UNITED STATES PATENT OFFICE.

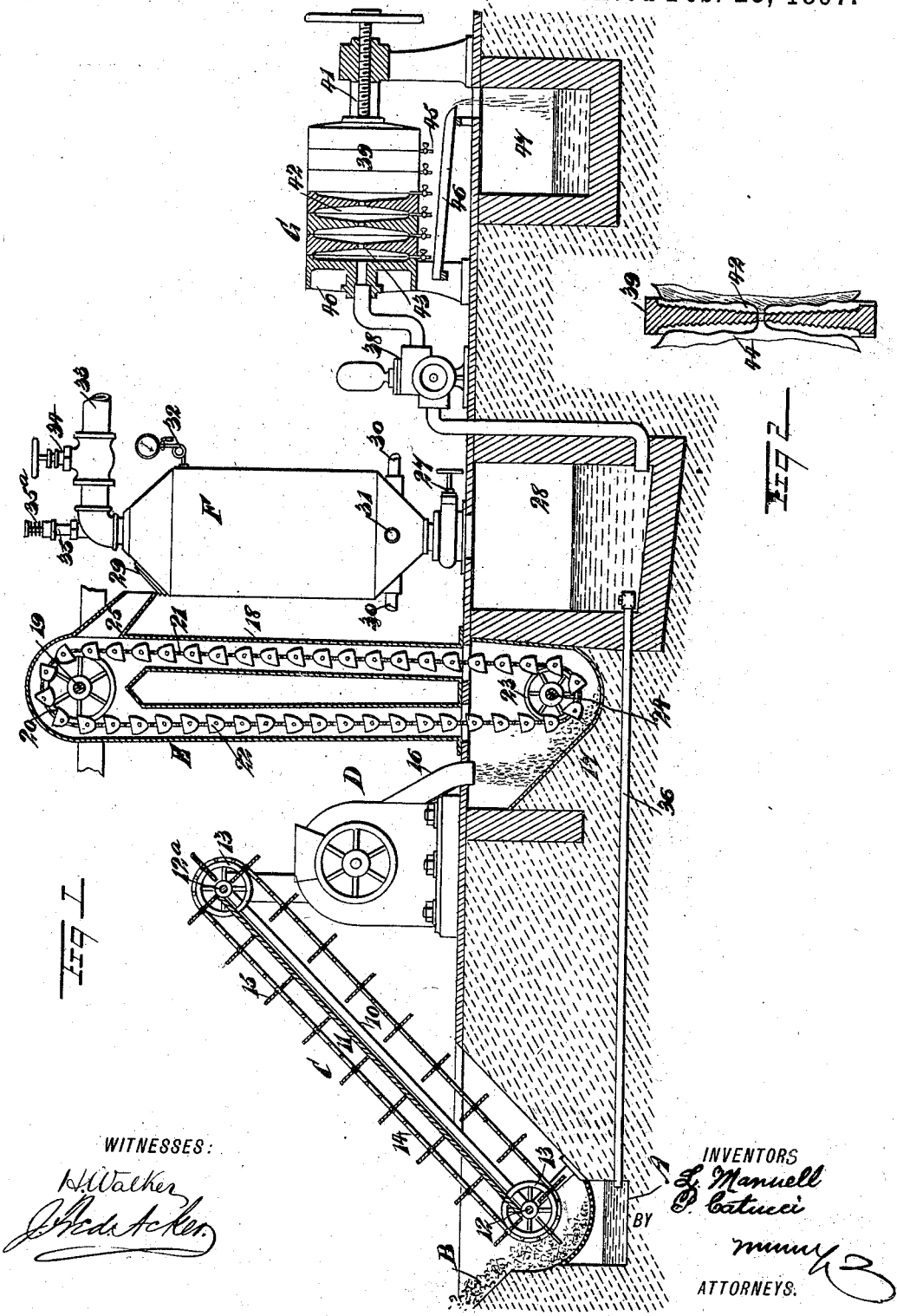

LAWRENCE MANUELL, OF NEWPORT, RHODE ISLAND, AND PLINY CATUCCI, OF NEW YORK, N. Y.

APPARATUS FOR MAKING FERTILIZERS FROM GARBAGE.

SPECIFICATION forming part of Letters Patent No. 577,769, dated February 23, 1897.

Application filed February 18, 1896. Serial No. 579,776. (No model.)

*To all whom it may concern:*

Be it known that we, LAWRENCE MANUELL, of Newport, in the county of Newport and State of Rhode Island, and PLINY CATUCCI, of New York city, in the county and State of New York, have invented a new and Improved Apparatus for the Utilization of Garbage and Organic Matter, of which the following is a full, clear, and exact description.
The object of this invention is to provide means for better disposing of garbage and other refuse or organic material and to produce therefrom a useful substance, such, for example, as "filling" for fertilization.
The invention consists in certain novel steps of the process and in the novel construction of the apparatus, all of which will be hereinafter fully described, and defined in the claims.
Reference is to be had to the accompanying drawings, forming a part of this specification, in which similar characters of reference indicate corresponding parts in both the figures.

Figure 1 is a partial side elevation and partial longitudinal vertical section through the apparatus employed for carrying out the method, and Fig. 2 is a vertical section through one of the members or cups of the filtering-press shown in Fig. 1.
A pit A is constructed, into which the material B to be treated is dumped, and a conveyer C is located partially within the said pit and extending above the mouth of the same any desired distance. The said conveyer is illustrated as consisting of a floor 10 and side boards 11, while at the boot portion of the conveyer and at the upper end thereof a shaft 13 is suitably journaled; the conveyer having any approved support at or near its two extremities. An endless belt 14 is passed over suitable wheels or pulleys 12 and 12ª, located on the upper and lower shafts 13, and the said belt is provided with plates 15, which stand at an angle to the bottom or bed 10 of the conveyer and take up the material from the aforesaid pit A, conducting it to the top portion of the conveyer, at which point the material is delivered to a disintegrator D, of any approved construction, in which machine the material is thoroughly pulverized and is delivered through a nozzle 16 in a plastic or semifluid state into a pit 17, as shown in Fig. 1. This pit is provided with a suitable cover, and above the pit an elevator E is supported in any desirable manner, the elevator shown comprising a casing 18, bifurcated at its lower portion and provided with a shaft 19 at its upper or body portion, carrying a suitable wheel or pulley 20, and an endless belt, preferably a chain belt 21, is passed over the pulley 20 and likewise around a second wheel 23, secured upon a shaft 24, journaled within the aforesaid pit 17. The belt 21 passes through suitable openings in the cover of the pit 17, and these openings are of sufficient size to permit of the passage of buckets 22, secured on the said chain.

The buckets take up the disintegrated material and deliver the same through a chute 25 at the top of the elevator-casing into a digester F. The digester is provided with a valve 27 at its bottom, which, when open, will permit the entire contents of the digester to escape and fall into the pocket or the third pit 28, (likewise shown in Fig. 1,) the material being received into the digester through an opening 29 at the top, which may be closed by a suitable cover.

At the base portion of the digester above the valve 27 steam-pipes 30 are entered and likewise pipes 31, connected with a source of water-supply, and a suitable gage 32 is connected at the upper portion of the digester, while at the top of said digester a pipe 33 is attached, adapted to conduct grease from the digester, the said pipe having a suitable valve 34, and preferably where the grease-conducting pipe enters the digester a pipe 35 is tapped into the grease-conducting pipe, provided with a valve 35ª, and the said pipe is adapted to carry off any obnoxious gases that may be formed in the digester and convey the same to the fire-box of the boiler, for example, below the fire, or to any other point where said gases will not contaminate the atmosphere. The pipe 35 we preferably denominate a "stink-pipe" and the valve 35ª a "stink-valve."

The material delivered from the digester into the pit or pocket 28 will be in a liquid form, and the fluid from the initial pit A is conducted through a pipe 36 into the digester-pit 28. The liquid matter in the digester-pit is drawn therefrom through the medium of a pump 38, of any desired construction, and is forced through a filter-press G, in which the bulk of the material is retained for commercial purposes, while the liquid portion thereof, after having been filtered, is delivered into a pit or a chute 47, from whence it may be conducted to the boiler and used as feed-water or be carried to any other desired place.

The filter-press G shown in the drawings is of that type designated as a "clay" filter-press or those used for the separation of the clay from the water in which it may have been washed. The press comprises a series of disks 39, the intermediate disks having cupped faces and the outer end disks being cupped upon their inner faces only, and these disks are held closely together in horizontal arrangement against a head 40, with which the discharge end of the pump 38 is connected by means of a screw and follower 41, mounted in a suitable frame. The cupped faces 42 of the parts of the filter-press receive and retain the solid matter contained in the digested material. Communication is established between the various pockets 42 by forming openings 43, preferably at the central portions of the disks. As illustrated in Fig. 2, filter-cloths, which may be and preferably are of canvas, are placed upon the cupped or dished surfaces of the filter-press, the cloth being apertured at that point where they would pass over the openings 43 in the disks. Drip-valves 45 are connected with the pockets 42 and deliver the filtered liquid into a suitable receptacle 46, from whence the said liquid is conducted and delivered into the aforesaid chute 47.

In the operation of the apparatus, after the material is delivered into the digester, its receiving-opening 29 is closed, likewise the valves 34 and 35$^a$, and water is turned on in suitable quantity through the pipes 31, after which steam is admitted through the pipes 30, and the contents of the digester are boiled for a predetermined length of time, or until the grease has been thoroughly separated from the aforesaid material, and at any time when the gases in the digester accumulate in too great quantities, as will be indicated by the gage, the stink-valve 35$^a$ is opened and the gases are permitted to escape and are conducted to a predetermined point. After the steam is turned off from the digester the material contained therein is permitted to settle and cool. The grease will rise to the top, and when this occurs the water is again admitted to the digester. The valve 34 in the grease-conducting pipe should now be opened, and the grease is floated up into the aforesaid pipe.

The digester having been practically freed from grease, the lower valve 27 is opened, and the contents of the digester are emptied into the pit 28 by the above-described operation. The digested material is caused to assume a semifluid or thickened-liquid-like form. From the pit 28 and by means of the pump 38 the digested material is forced through the filter-press and the liquid separated from the more solid elements of the mixture. These solid substances are retained in the press, from which they may be removed by releasing the screw 41 and separating the disks 39. The residue in the press G may be used to advantage for various commercial purposes.

We desire it to be understood that persons may be stationed at the sides of the conveyer to remove therefrom any such material as cans, glass, leather, &c., which may not be successfully passed through the other portions of the apparatus.

Having thus described our invention, we claim as new and desire to secure by Letters Patent—

An apparatus for treating garbage, the apparatus having a pit, a conveyer leading from the pit, a disintegrator to which the conveyer feeds, the disintegrator emptying into a second pit, an elevator rising from the second pit, a casing inclosing the elevator, a digester to which the elevator extends, a third pit in which the digester empties, a pump communicating with the third pit, and a filter fed by the pump, substantially as described.

LAWRENCE MANUELL.
PLINY CATUCCI.

Witnesses:
J. FRED. ACKER,
JNO. M. RITTER.